(12) United States Patent
Emmendorfer et al.

(10) Patent No.: US 9,338,024 B2
(45) Date of Patent: May 10, 2016

(54) EXTENDED LAYER TWO TUNNELING PROTOCOL APPLICATIONS AND ARCHITECTURES

(75) Inventors: Michael Emmendorfer, Aurora, CO (US); Tom Cloonan, Lisle, IL (US); Erich Arnold, Naperville, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1971 days.

(21) Appl. No.: 12/082,498

(22) Filed: Apr. 11, 2008

(65) Prior Publication Data

US 2008/0285592 A1 Nov. 20, 2008

Related U.S. Application Data

(60) Provisional application No. 60/911,224, filed on Apr. 11, 2007.

(51) Int. Cl.
*H04L 12/46* (2006.01)
*H04L 12/28* (2006.01)

(52) U.S. Cl.
CPC ........ *H04L 12/4633* (2013.01); *H04L 12/2861* (2013.01)

(58) Field of Classification Search
CPC .................. H04L 12/2861; H04L 12/4633
USPC .................. 370/244, 352, 392, 351, 464, 474
See application file for complete search history.

(56) References Cited

U.S. PATENT DOCUMENTS

| | | | |
|---|---|---|---|
| 6,522,627 B1 * | 2/2003 | Mauger ......................... | 370/230 |
| 7,028,183 B2 * | 4/2006 | Simon et al. .................. | 713/168 |
| 7,266,124 B2 * | 9/2007 | Kim et al. ..................... | 370/397 |
| 7,409,450 B2 * | 8/2008 | Jorgensen ...................... | 709/226 |
| 7,468,956 B1 * | 12/2008 | Leelanivas et al. ............ | 370/255 |
| 7,516,224 B2 * | 4/2009 | Guichard et al. ............. | 709/227 |
| 7,535,856 B2 * | 5/2009 | Booth et al. ................. | 370/255 |
| 7,633,956 B1 * | 12/2009 | Parandekar et al. .......... | 370/401 |
| 7,649,848 B1 * | 1/2010 | Swan et al. ................... | 370/252 |
| 7,710,902 B2 * | 5/2010 | Vasseur et al. ................ | 370/254 |
| 7,751,339 B2 * | 7/2010 | Melton et al. ................. | 370/252 |
| 2002/0010866 A1 * | 1/2002 | McCullough et al. ........ | 713/201 |
| 2004/0081203 A1 * | 4/2004 | Sodder et al. ................. | 370/469 |
| 2004/0221051 A1 * | 11/2004 | Liong et al. ................... | 709/230 |
| 2005/0265397 A1 * | 12/2005 | Chapman et al. ............. | 370/490 |
| 2006/0015921 A1 * | 1/2006 | Vaughan ....................... | 725/127 |
| 2006/0092955 A1 * | 5/2006 | Durbin et al. ................. | 370/401 |
| 2006/0126644 A1 * | 6/2006 | Akahane et al. ......... | 370/395.53 |
| 2006/0187900 A1 * | 8/2006 | Akbar ............................ | 370/352 |
| 2007/0098006 A1 * | 5/2007 | Parry et al. .................... | 370/437 |
| 2007/0124488 A1 * | 5/2007 | Baum et al. ................... | 709/230 |

(Continued)

OTHER PUBLICATIONS

Cisco Systems, Cisco IOS MPLS Virtual LAN Service, copyright 1992-2004.*

(Continued)

*Primary Examiner* — Chi H Pham
*Assistant Examiner* — Robert Lopata
(74) *Attorney, Agent, or Firm* — Bart A. Perkins (57) ABSTRACT

A device, deployed at the edge of a provider network, includes logic to receive traffic from one or more customer edge devices, and to encapsulate the customer traffic into a Layer 2 tunnel of an IP frame. The IP frame in further included within an Ethernet frame, and quality of service priority bits are promoted from the customer traffic into both the IP frame and the Ethernet frame.

18 Claims, 5 Drawing Sheets

(56) References Cited

U.S. PATENT DOCUMENTS

| | | | |
|---|---|---|---|
| 2008/0123651 A1* | 5/2008 | Vasseur et al. | 370/392 |
| 2008/0159140 A1* | 7/2008 | Robinson et al. | 370/232 |
| 2008/0198747 A1* | 8/2008 | Young et al. | 370/232 |
| 2008/0240122 A1* | 10/2008 | Richardson et al. | 370/401 |
| 2009/0274156 A1* | 11/2009 | Emmendorfer et al. | 370/395.53 |
| 2009/0290543 A1* | 11/2009 | Desai et al. | 370/328 |

OTHER PUBLICATIONS

Patel, B., et al., "Securing L2TP using IPSEC", May 1998, PPPTEXT Working Group, pp. 1-10.*

* cited by examiner

FIG. 1

| CE DEVICE 102 |
| --- |
| ENHANCED CPE 103 |
| DOCSIS TRANSPORT NETWORK 104 |
| CMTS 105 |
| PSN 106 |
| DISTRIBUTION ROUTER 107 |
| PSN 108 |
| CORE 109 |
| PSN 110 |
| DISTRIBUTION ROUTER 111 |
| PSN 112 |
| MULTILAYER SWITCH OR ROUTER 213 |
| PSN 214 |
| L2TPV3 DEVICE 215 |
| CE DEVICE 116 |

EXTENDED LAYER TWO TUNNELING PROTOCOL APPLICATIONS AND ARCHITECTURES

PRIORITY CLAIM

This application claims priority under 35 USC 119 to USA provisional application No. 60/911,224 filed on Wednesday, Apr. 11, 2007, which is incorporated herein by reference.

BACKGROUND

The Internet Engineering Task Force (IETF) has defined protocols in the area of Layer Two Tunneling Protocol—Version 3 (L2TPv3) and Pseudo Wire Emulation Edge-to-Edge (PWE3) Architecture, as defined in RFC 3193, RFC 3931, RFC 3985, RFC 4591, and RFC 4719. The L2TPv3 pseudo wires may support multiple types of layer two encapsulations or "Pseudowire Types", including protocols similar in packet format to IEEE 802.3, virtual LAN tagging protocols such as IEEE 802.1Q, IEEE 802.1ad, and IEEE 802.1ah, as well as Point-to-Point Protocol (PPP), Frame Relay, and other layer 2 technologies.

As defined in the standard track protocols above, the Pseudowire Types including Ethernet, VLAN, PPP, or Frame Relay, etc are encapsulated into "L2TPv3" to emulate a single layer 2 tunnel link between exactly two endpoints.

Enabling L2TPv3 on cable modems (CM), embedded multimedia terminal adapters (E-MTA), cable modem routers (CM-R), cable modem with Circuit Emulation Service (CES), cable modem with IPSec or Firewall and/or similar DOCSIS Customer Premise Equipment (D-CPE) will allow L2TPv3 IP packets to be encapsulated into Data Over Cable Service Interface Specification (DOCSIS) data frames for two-way data transmission in a cable system. Devices with this capability are referred to herein as "L2TPv3 enabled DOCSIS CPE", or simply "Enhanced CPE".

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

Overview

Described herein are features, functions, and network architectures to enable Enhanced CPEs that do more than simply provide L2TPv3 across DOCSIS data frames for point-to-point (P-P) connections. Enhanced CPEs may support point-to-multipoint (P-MP) and multipoint-to-multipoint (MP-MP) connections from a single Enhanced CPE device.

To provide these features, the Enhanced CPE device may comprise:
  multiple physical ports facing the customer edge
  multiple layer two sessions sharing common hardware, i.e. logical connection from shared physical interfaces, such that IEEE 802.1Q, IEEE 802.1ad, and/or IEEE 802.1ah may define the destination layer two tunnel(s)
  one or multiple IP addresses
  Virtual Switching Instance (VSI) logic
  one or more fully qualified domain names
  Ethernet port-to-port interfaces whereby an Ethernet interface on the Enhanced CPE is mapped to a corresponding layer two tunnel interface at the end point termination
  Enhanced CPE with Virtual Switch Instance An Enhanced CPE configured with a Virtual Switch Instance (VSI) may support true MP-MP services. For example, an Enhanced CPE with VSI may support services defined by the Metropolitan Ethernet Forum (MEF)'s for E-LAN Services and the IEFT's Virtual Private LAN Service (VPLS). The VSI is not required for the Enhanced CPE to support P-P, P-MP, or even MP-MP connections, but without the VSI the Enhanced CPE may not emulate the IETF and MEF defined multipoint services described above. Without VSI functionality, many single P-P connections may be used to emulate MP-MP.

The VSI may provide, among other functions:
  basic switching
  MAC address learning
  flooding unknown frames
  traffic replication
  aging MAC addresses An Enhanced CPE with VSI may employ split-horizon instead of spanning tree protocols (STP). Doing so may provide the layer two tunnels with loop-avoidance because the Layer 2 technologies deployed in the system facing the service provider's core may also employ these loop-avoidance techniques. IP packet switched networks may thus be used instead of Multiprotocol Label Switching for Virtual Private LAN Services.

Hierarchical Layer 2 Architecture

Enhanced CPE devices supporting P-MP and MP-MP services may be organized into a Hierarchical L2TPv3 Architecture that supports the IETF's Virtual Private LAN Service (VPLS) and several types of Metro Ethernet Forum's E-LAN service definitions. The features, function, and architectures that are described may be deployed beyond Enhanced CPEs, to include Cable Modem Termination Systems (CMTS), Ethernet Switches, Switch Routers, Routers, and other network devices.

A Hierarchical L2TPv3 Architecture using Enhanced CPEs with VSI capabilities may offer advantages over the hub and spoke designs or full flat mesh architectures that commonly scale according to N*(N−1), where N is the number of nodes. In a hub and spoke architecture all traffic terminates at the hub and then is retransmitted to the desired spoke locations. This may have higher costs in terms of bandwidth (paying for traffic twice) and may also lower performance.

Traffic Classification and Quality of Service

Traffic classification and quality of service (QoS) are essential requirements for many business customers and services providers. Mappings are described of customer edge (CE) to L2TPv3, and specifically mapping this traffic into DOCSIS packet classifiers and service flows across a two way DOCSIS system. For examples, voice traffic may be provided with greater priority over best effort data flows. Another example is support for Committed Information Rate (CIR) and Excess Information Rate (EIR) for certain traffic types. For example, by employing Enhanced CPE devices as described herein, cable operators may expand quality of service treatment beyond those defined in Type of Service/Differentiated Service values.

The mapping of layer two tunnel traffic into DOCSIS service flows may enable traffic marked from the CPE device and/or marked at the ingress connection point of the layer two tunneling session to gain the benefit of DOCSIS quality of service, special traffic treatment, and priority. Traffic priority, CIR, & EIR information expected from the customer edge device may be mapped into classifiers and service flows in a DOCSIS network.

Customer edge device 802.1P/Q packet fields may be placed into layer two tunnels, and the device may then add one or more packet field(s) to the outside of specified layer two tunnel packets. A cable modem device may identify the priority based on the classifier and map these into services flows. Mapping of packet format including IEEE 802.3, virtual LAN tagging protocols such as IEEE 802.1Q, IEEE 802.1ad, and IEEE 802.1ah and/or 802.1p enterprise customer traffic may be mapped into L2TPv3 Tunnels. These tunnels may add Differentiated Services Code Point (DSCP) field code [RFC2474], for independent sessions or traffic flows. These L2TPv3 IP Packets that may have DSCP field markings are carried internally to the DOCSIS layer for classification and services flow creation.

The Enhanced CPE having received the enterprise customer traffic which is then encapsulated into L2TPv3 that may have service provider DSCP field markings added for DOCSIS classifiers and for QoS transit across IP packet switched networks. The Enhanced CPE has several methods for marking packets and/or Ether frames into DOCSIS classifiers and services flows. The Enhanced CPE may enable layer 2 (Ethernet) and/or layer 3 (IP) classifiers. These may include but not limited to Layer 2 classifiers such as source MAC address, destination MAC, or IEEE 802.1 P/Q classification. The Enhanced CPE may enable layer 3 classifiers such as but not limited to DSCP (Types of Services Byte), IP Protocol, source IP address, and destination IP address. Enhanced CPE with defined classifier(s) are then placed into service flows to enable QoS services across the DOCSIS access network. If the service provider configures the Enhanced CPE to place DSCP fields, these are carried across the packet switched network.

Secure Communication

Also described is an Enhanced CPE with IPSec capabilities for secure tunnels to end points, and techniques for carrying forward QoS treatment from CE ingress points into L2TPv3 packet flows and further into IPSec tunnels. The Enhanced CPEs described herein may provide attributes sought from customers and operators alike in terms of differentiating types of traffic and supporting service level agreements. The Enhanced CPEs may also help ensure that sensitive traffic is protected across the shared DOCSIS access Network and across Service Provider Managed or Internet networks to destination end-points.

Separate Internet Connections and Multimedia Terminal Adapters

Enhanced CPE devices may support a separate Internet connection apart from the L2TPv3 tunnels. This may allow customers and services providers to define physical ports or logical identifiers to transmit and receive Internet traffic with the Enhanced CPE device.

An Enhanced CPE may also comprise multimedia terminal adapters MTA(s) that enable hosted voice services separate from layer two tunnel traffic connecting end customer sites. Conversely the MTA(s) may be part of the layer two tunnels that connects enterprise or end-customer locations such that telephony services may be delivered independent of the operator. In this scenario, phone service may be provided by the enterprise or designated third party and voice traffic may be part of the layer two tunnel(s) and perhaps given priority of service as well.

Enhanced CPEs with embedded MTAs may register and be provisioned for voice services by, for example, a cable operator. Voice service traffic may not be associated with layer two tunnel services and may comprise QoS features expected by facilities-based service providers. The Enhanced CPE with embedded MTAs may be provisioned and managed by the enterprise (e.g. end-customer of a cable operator). The Enhanced CPE may allow the MTAs to be mapped into the layer two tunnels for configuration and traffic aggregation across layer two connections. In this manner the enterprise customer may benefit from features such as sub-seven digit dialing and other calling features while using lower cost phones when compared to phones enabled with IP interfaces.

Point-Point Architectures and Communication Models

Figure 1:
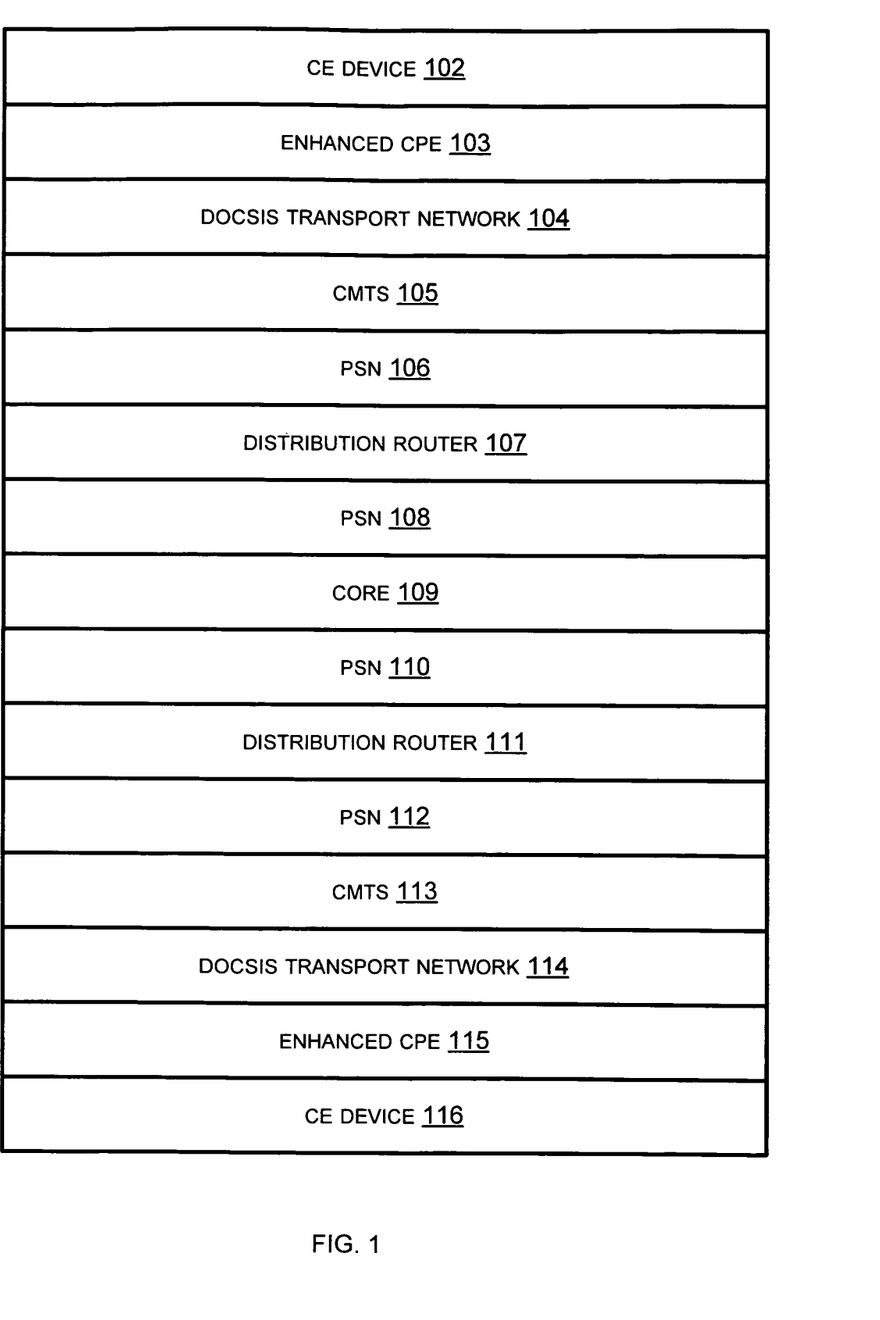
FIG. 1 is a block diagram illustration of an embodiment of a point-to-point (P-P) communication architecture and model in a cable provider network.

FIG. 1 is a block diagram illustration of an embodiment of a point-to-point (P-P) communication architecture and model in a cable provider network. A CE device 102 communicates P-P with another CE device 116. Examples of CE devices 102, 116 are routers, switches, gateways, etc. at the edge of a customer's private network. Each CE device 102, 116 may access the cable provider's network via an associated Enhanced CPE 103, 115, respectively. The Enhanced CPEs 103, 115 form the edge of the cable provider network. The Enhanced CPEs 103, 115 may comprise logic to enable the features and functions described herein.

The Enhanced CPEs 103, 115 communicate with one another using one or more PseudoWire emulations, the type of which may vary according to the implementation and/or application. The PseudoWire emulation may be provided inside a Layer 2 tunnel (e.g. L2TPv3). A DOCSIS transport may be employed between the Enhanced CPEs 103, 115 and associated cable modem termination systems 104, 114, respectively. The Enhanced CPEs 103, 115 may encapsulate Layer 2 traffic from the CE devices 102, 116 into DOCSIS frames and service flows. At this point within the cable provider network, packet switched transport (PSN) 106, 112 may be employed from the CMTSs 104, 114 to distribution routers 107, 111 and again 108, 110 between the routers 107, 111 and the network core 109. The PSN transports may employ, for example, IP or MPLS packet forwarding techniques.

Figure 2:
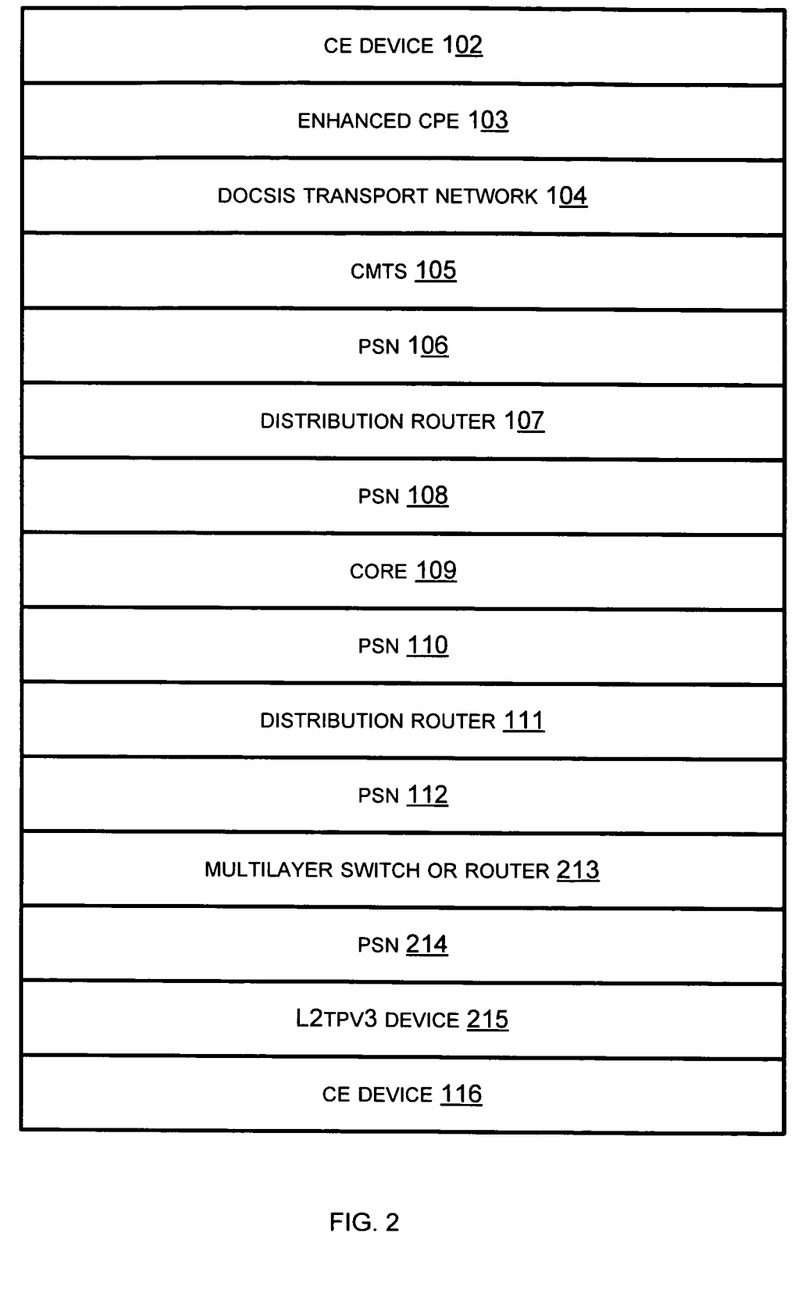
FIG. 2 is a block diagram illustration of an embodiment of a point-to-point (P-P) communication architecture and model in a cable provider network.

FIG. 2 is a block diagram illustration of an embodiment of a point-to-point (P-P) communication architecture and model in a cable provider network. Communication in the system embodiment of FIG. 2 is similar to that which was described in conjunction with FIG. 1. However, in the system of FIG. 2, an Enhanced CPE device 103 communicates with another provider edge device 215 that is not a DOCSIS device. For example, the other device 215 may be a switch or router implementing L2TPv3, perhaps using optical Ethernet or other fast (e.g. faster than DOCSIS) bandwidth technology. Transport from the provider's packet switched transport 112 to, for example, a multi-layer switch/router 213 and again via a PSN 214 to the non-DOCSIS PE device 215.

In some implementations the emulated service is an Ethernet Pseudowire P-P connection encapsulated using L2TPv3 or higher in DOCSIS frames as a Layer 2 tunnel. The Ethernet Pseudowire defines Ethernet port-to-port mappings between the CE devices 102, 116, making it compliant with the IETF Virtual Private Wire Service. In this situation an ingress frame at a port associated with a connection can be an egress frame at one and only one destination port associated with the connection, where the port may be on the same or on a separate physical device. In some implementations the connections are defined by VLAN IDs instead of ports.

Figure 3:
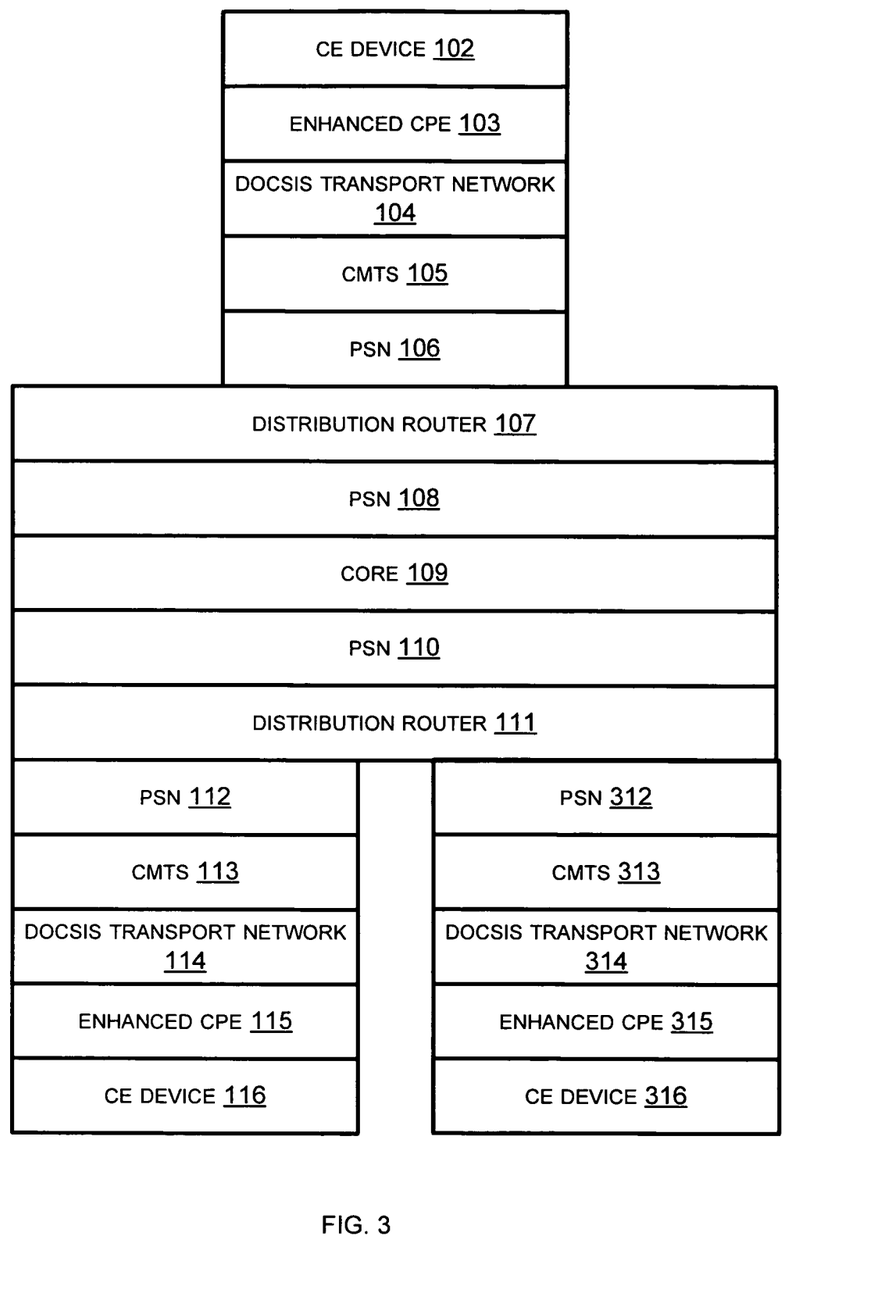
FIG. 3 is a block diagram illustration of an embodiment of a multiple point-to-point (P-P) communication architecture and model in a cable provider network.

FIG. 3 is a block diagram illustration of an embodiment of a multiple point-to-point (P-P) communication architecture and model in a cable provider network. The CE device 102 maintains two separate connections to the CPE 103, each connection representing a P-P connection with a different CE device 116, 316. The separate P-P connections could also be to two separate ports on the same physical device. An ingress frame to a CPE device can only be an egress frame at exactly one other CPE device associated with a connection. Thus this communication architecture would not exemplify true multi-point services. The distribution router 111 directs communications to/from either of paths 112-116 or 312-316, depending on which connection the communication is carried over.

The distribution router 111 is illustrated as a point in the provider network where the different P-P connections digress to their respective different endpoint devices; however, in practice this digression could take place at a number of other points in the network, for example at distribution router 107 and/or at other switches and routers.

In some implementations each P-P connection is an Ethernet Pseudowire P-P connection encapsulated in DOCSIS frames as a Layer 2 tunnel, using L2TPv3 or higher. Port-to-port mappings may define the connection between the CE devices 102 and 116 and between 102 and 316, or the connections may be defined by VLAN IDs instead of ports.

Mapping Quality of Service to DOCSIS Service Flows

An Enhanced CPE device may perform, in some implementations, at least the following operations on information received from a CE device.

1. Packaging Ethernet frames of the CE data into IP frames carried by Ethernet frames, where the data payload of the IP frames is the actual Ethernet frames from the CE device formatted according to a Layer 2 tunneling protocol. For example, the Enhanced CPE encapsulates the CE Ethernet frame in an IP frame using L2TPv3 or higher, then encapsulates the IP frame into another Ethernet frame. In other words, a CE Ethernet frame may be reformatted to appear as a similar Ethernet frame, except that the Ethernet frame now carries an IP frame that in turn carries the original Ethernet frame from the CE device, the original Ethernet frame encapsulated into a Layer 2 tunnel. In some implementations, the IP frame is IPv4. In others, it may be IPv6 or other versions of the IP protocol.

2. During the repackaging described in (1) above, "promotion" may occur of QoS bits and/or VLAN IDs (e.g. Q-tag information) from CE protocol headers to protocol headers of the IP and/or Ethernet frames. "Promoted" bits are bits whose meaning is duplicated in the added headers. These promoted bits may be used by the DOCSIS classifier and elsewhere in the provider network and/or external network (e.g. Internet) to preserve QoS requirements for the CE data during transport of the CE data through these other networks.

Mapping of the promoted QoS bits and/or VLAN IDs into DOCSIS service flows. For example, in some implementations the promoted bits may include three 802.1q P-bits (also called 802.1p bits) that define a service level for the CE data. These P-bits may be promoted to "TOS/Traffic Class bits" in the added IPv4/v6 header, so that if the data is later routed within (or external to) the provider network using IP packet switching, the routers/switches of the provider (or external) network may reference the TOS bits to preserve the QoS of the CE data. The TOS bits and possibly other bits (e.g. VLAN ID) of the CE data Q-tag may also be referenced by a DOCSIS classifier comprised by the Enhanced CPE to map the CE data to DOCSIS service flows that preserve the QoS of the CE data between the Enhanced CPE and a CMTS of a provider cable network.

3. The repackaged CE data may be processed by a DOCSIS classifier comprised by the Enhanced CPE device and mapped into one or more DOCSIS service flows. These service flows may, in cable network implementations, be transported from the Enhanced CPE device through the provider network to a CMTS, while respecting the original QoS requirements of the CE data. The CMTS may remove the outer Ethernet framing and forward the received data as IP packets. These IP packets may be routed using IP packet switching, and respecting the original QoS of the CE data, through the provider network and/or external networks toward their final destination. If the destination CE device is a client of the provider cable network, the packets may be reformatted by a destination CMTS for last-leg transport using DOCSIS to the provider edge destination device.

Point to Multipoint Service

Point-to-multipoint (P-MP) service may be provided using architectures similar to those described for P-P in conjunction with FIGS. 1-3.

For example, P-MP service may be provided by defining an Ethernet P-MP Pseudowire type which will cause the Enhanced CPE device to multiplex packets of a single CE data inbound connection to multiple P-P outbound connections. Unlike the port-port or VLAN mappings P-P models described above, for multipoint service a single CE data ingress frame may be an egress frame to multiple destination ports or VLANs.

Each outbound connection from the Enhanced CPE may encapsulate the CE data into a Layer 2 tunnel within an IP packet carried by an Ethernet frame, as described above. The QoS of the CE data may be preserved within the provider network and/or external networks, also for example as described above.

Multipoint to Multipoint Service

Figure 4:
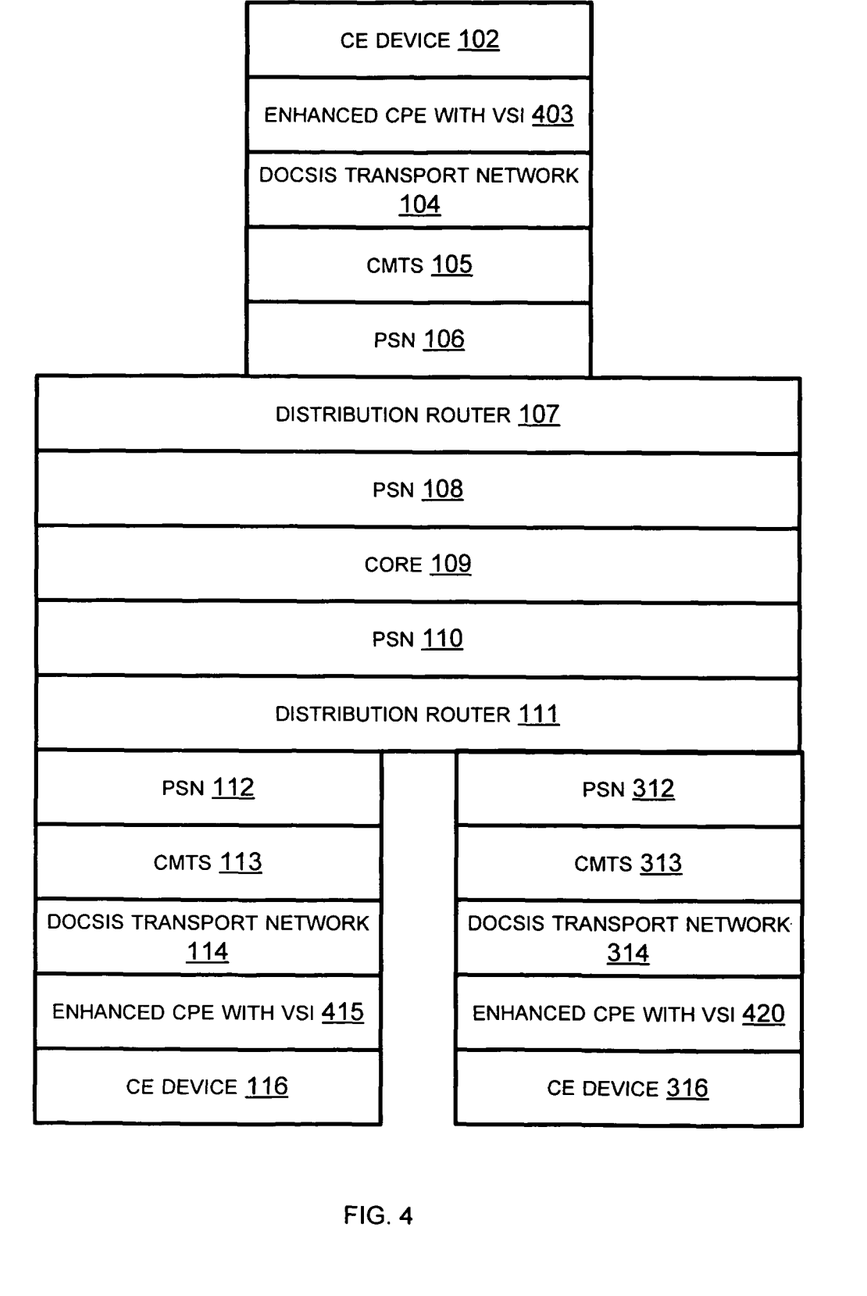
FIG. 4 is a block diagram of an embodiment of an architecture supporting multi-point-to-multi-point (MP-MP) service to customers in a cable provider network.

Multipoint-to-Multipoint (MP-MP) Layer 2 service in compliance with IETF and MEF specifications may be provided by incorporating Virtual Switch Instance (VSI) logic within the Enhanced CPE device. VSI logic, the operation of which is known in the art, may be incorporated into an Enhanced CPE device in order to emulate, for example, an Ethernet bridge from the perspective of CE devices. FIG. 4 is a block diagram of an embodiment of an architecture supporting MP-MP service to customers in a cable provider network. Enhanced CPE devices 403, 415, and 420 employing VSI in combination with, for example, L2TPv3 tunneling and DOCSIS transport may provide Virtual Private LAN Service (VPLS) to customers of a cable provider network. The VSI logic may provide packet flooding, MAC address learning, and packet forwarding, among other functions, in much the same manner as a customer's own Layer 2 Ethernet bridge and/or switch would, thus making the provider network appear as an extension of the customer's own LAN. Multiple customer VLANs may be implemented within the VPLS services provided by the Enhanced CPEs incorporating VSI logic.

Enhanced CPE Device Logic

Figure 5:
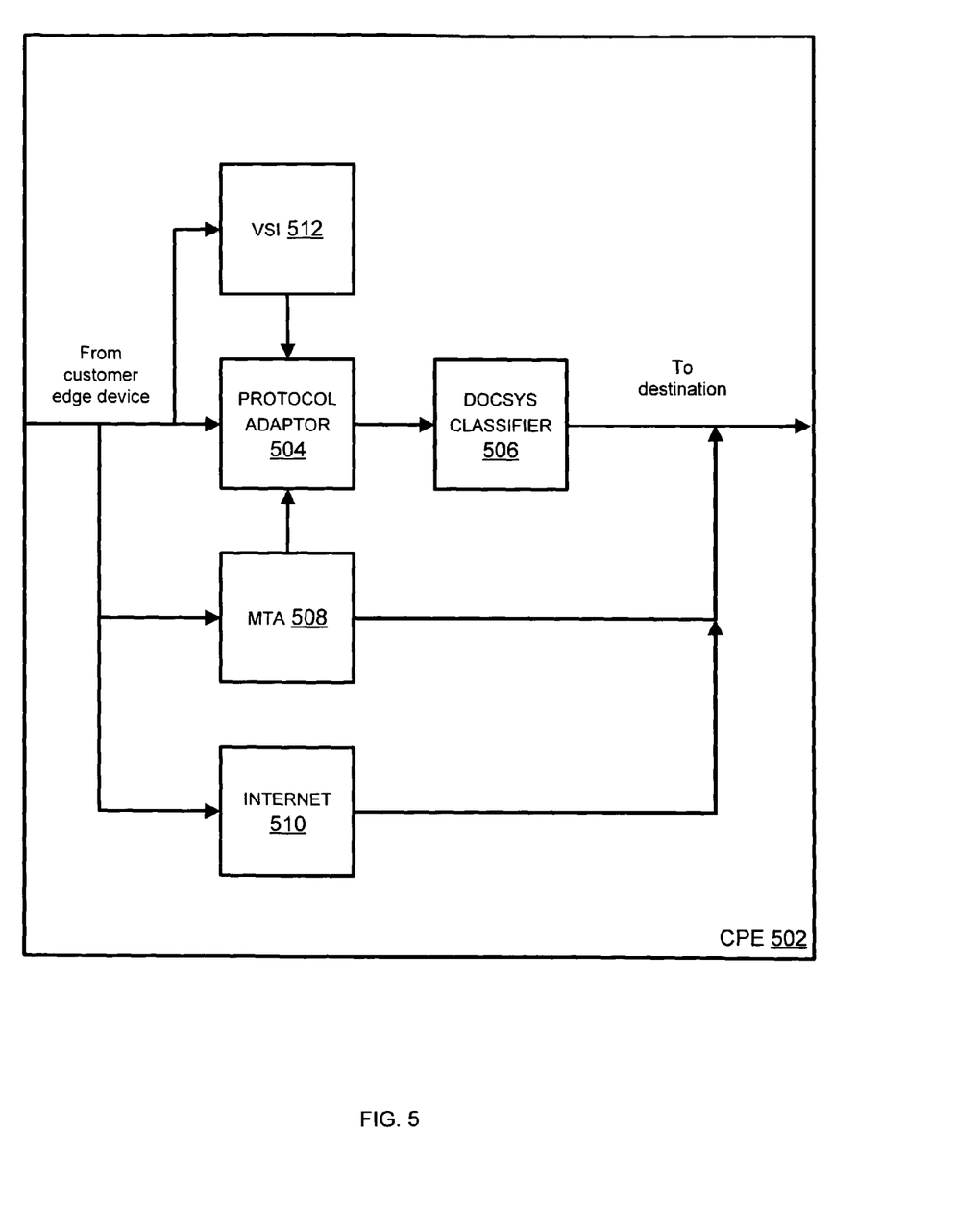
FIG. 5 is a block diagram of an embodiment of an Enhanced CPE device including logic to provide features and functions described herein.

FIG. 5 is a block diagram of an embodiment of an Enhanced CPE device including logic to provide features and functions described herein. A CPE 503 comprises VSI logic 512, protocol adapting logic 504, DOCSIS classifier logic 506, MTA logic 508, and Internet connectivity logic 510. The VSI logic 512 analyzed customer traffic and maps the traffic to Layer 2 tunnels. The protocol adaptor 504 encapsulates the customer traffic into Layer 2 tunnels within an IP packet, and includes the IP packet in an Ethernet packet. The protocol adaptor 504 promotes QoS priority bits from the customer traffic to the IP and Ethernet headers. The Ethernet packet is passed to the DOCSIS classifier 506, which maps the promoted QoS priority bits to DOCSIS service flows.

The CPE 502 further includes MTA logic 508 for providing voice/telephone services either in conjunction with or separately from the Layer 2 tunneling. Internet connectivity is also supported via Internet connection logic 510.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. An edge device of a provider network, the edge device comprising:
   non-transitory machine-readable media and circuitry comprising logic to receive customer traffic from a customer edge device;
   logic to encapsulate the customer traffic into a Layer 2 tunnel of an Internet Protocol frame (IP IP frame) to form an encapsulated Layer 2 tunnel;
   logic to include the IP frame in an Ethernet frame; and
   logic to promote quality of service priority bits from the customer traffic into both the IP frame and the Ethernet frame.

2. The edge device of claim 1, further comprising:
   logic to map the quality of service priority bits promoted from the customer traffic into Data Over Cable Service Interface Specification service flows (DOCSIS service flows).

3. The edge device of claim 1, further comprising:
   Virtual Switching Instance logic (VSI logic).

4. The edge device of claim 1, further comprising:
   Internet Protocol Security logic (IPSec logic) to secure the encapsulated Layer 2 tunnel.

5. The edge device of claim 1, further comprising:
   logic to support Internet connections by the customer edge device separate from the encapsulated Layer 2 tunnel.

6. The edge device of claim 1, further comprising:
   multimedia terminal adapters logic (MTA logic).

7. The device of claim 1, further comprising:
   logic to implement a hierarchical Layer 2 tunnel protocol architecture.

8. A method performed in a provider edge device, comprising:
   encapsulating customer traffic in a Layer 2 tunnel within an IP packet;
   including the IP packet in an Ethernet packet; and
   promoting priority bits of the customer traffic into a header of the IP packet and a header of the Ethernet packet.

9. The method of claim 8, further comprising:
   passing the Ethernet packet to a DOCSIS classifier.

10. The method of claim 9, further comprising:
    routing the Ethernet packet via VSI logic.

11. The method of claim 8, further comprising:
    processing hosted voice services separate from the Layer 2 tunnel.

12. The method of claim 8, further comprising:
    processing hosted voice services within the Layer 2 tunnel.

13. The method of claim 8, further comprising:
    securing the Layer 2 tunnel using IPSec logic.

14. A cable network, comprising a plurality of edge devices, each edge device comprising:
    non-transitory machine-readable media and circuitry comprising logic to receive customer traffic from a customer edge device and to encapsulate the customer traffic into a Layer 2 tunnel of an IP frame; and
    logic to include the IP frame in an Ethernet frame, and to promote quality of service priority bits from the customer traffic into both the IP frame and the Ethernet frame.

15. The cable network of claim 14, wherein each of the plurality of edge devices further comprises logic to map the quality of service priority bits promoted from the customer traffic into DOCSIS service flows.

16. The cable network of claim 14, wherein each of the plurality of edge devices further comprises VSI logic implementing an Ethernet Layer 2 bridge.

17. The cable network of claim 14, wherein each of the plurality of edge devices further comprises IPSec logic to secure the Layer 2 tunnel.

18. The cable network of claim 14, wherein each of the plurality of edge devices further comprises logic to support Internet connections by the customer edge device separate from the Layer 2 tunnel.

* * * * *